(12) United States Patent
Vauchel

(10) Patent No.: US 7,461,871 B2
(45) Date of Patent: Dec. 9, 2008

(54) LATCH FOR JOINING TWO PANELS OF AN AIRPLANE STRUCTURE

(75) Inventor: Guy Bernard Vauchel, Le Havre (FR)

(73) Assignee: AIRCELLE, L'Orcher (FR)

( * ) Notice: Subject to any disclaimer, the term of this patent is extended or adjusted under 35 U.S.C. 154(b) by 68 days.

(21) Appl. No.: 10/560,254

(22) PCT Filed: Jun. 30, 2004

(86) PCT No.: PCT/FR2004/001672

§ 371 (c)(1),
(2), (4) Date: Jan. 21, 2006

(87) PCT Pub. No.: WO2005/014962

PCT Pub. Date: Feb. 17, 2005

(65) Prior Publication Data

US 2006/0138785 A1    Jun. 29, 2006

(30) Foreign Application Priority Data

Jul. 10, 2003    (FR) .................................. 03 08434

(51) Int. Cl.
*E05C 5/00*    (2006.01)
*E05C 19/12*    (2006.01)

(52) U.S. Cl. ................. 292/113; 292/DIG. 31
(58) Field of Classification Search ................ 292/247, 292/246, 250, 256, DIG. 63, DIG. 31, 113, 292/109
See application file for complete search history.

(56) References Cited

U.S. PATENT DOCUMENTS

| | | | | |
|---|---|---|---|---|
| 2,750,217 A | * | 6/1956 | Landholt | 292/97 |
| 2,783,072 A | * | 2/1957 | Sessler | 292/256 |
| 3,428,348 A | * | 2/1969 | Swanson | 292/113 |
| 4,116,479 A | * | 9/1978 | Poe | 292/113 |
| 4,318,557 A | * | 3/1982 | Bourne et al. | 292/113 |
| 4,743,052 A | * | 5/1988 | Stammreich et al. | 292/113 |
| 5,152,559 A | * | 10/1992 | Henrichs | 292/113 |

(Continued)

FOREIGN PATENT DOCUMENTS

DE    682 872 C    10/1939

(Continued)

*Primary Examiner*—Patricia Engle
*Assistant Examiner*—Alyson M Merlino
(74) *Attorney, Agent, or Firm*—Oliff & Berridge, PLC

(57) ABSTRACT

The invention relates to a latch (1) provided for joining two elements to one another via, on the one hand, a hook (2) capable of coming into contact with a retaining element (18) integrally connected to the first element and, on the other, via a main pin (3) to be attached in a fixed manner to the second element. Said latch has a handle (6) that is mounted so that it can pivot about an end pin (13) and has an articulation having a pair of compression links (4) mounted in a manner that enables them to pivot about the main pin (3) and about an intermediate pin (14). The invention is characterized in that the hook is inserted between the handle and the main pin, and in that at least one compression link (4) is provided with a guiding means (21) capable of coming into contact with the surface of the hook facing the handle during the opening of the latch.

12 Claims, 4 Drawing Sheets

U.S. PATENT DOCUMENTS

| | | | | |
|---|---|---|---|---|
| 5,620,212 A | * | 4/1997 | Bourne et al. | 292/113 |
| 5,984,382 A | * | 11/1999 | Bourne et al. | 292/113 |
| 6,279,971 B1 | * | 8/2001 | Dessenberger, Jr. | 292/113 |
| 6,343,815 B1 | | 2/2002 | Poe | |

FOREIGN PATENT DOCUMENTS

| | | |
|---|---|---|
| EP | 0 431 769 A2 | 6/1991 |
| EP | 431769 A2 * | 6/1991 |

* cited by examiner

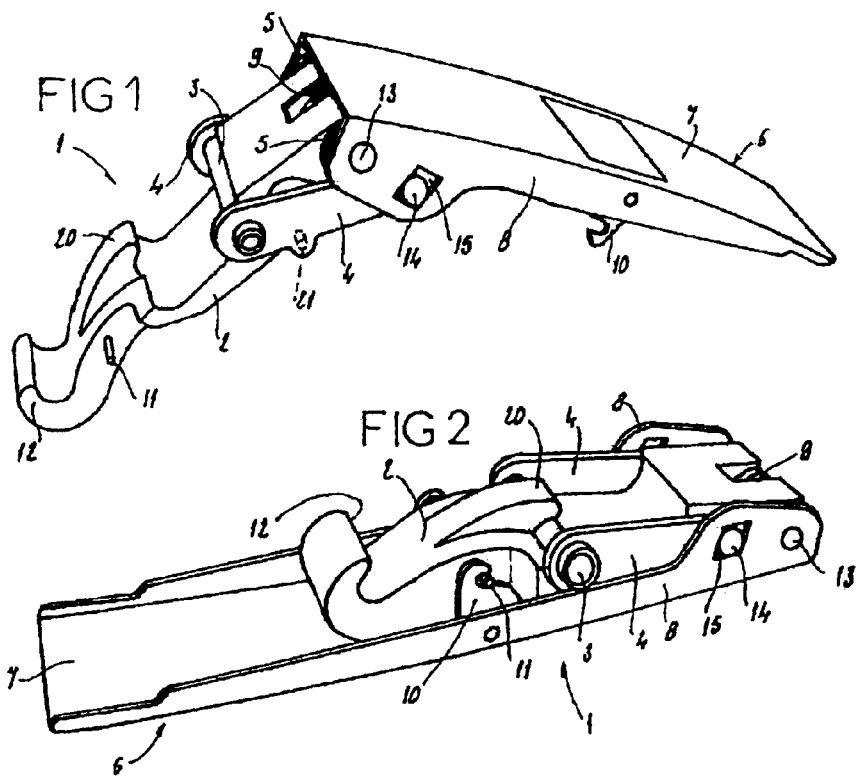
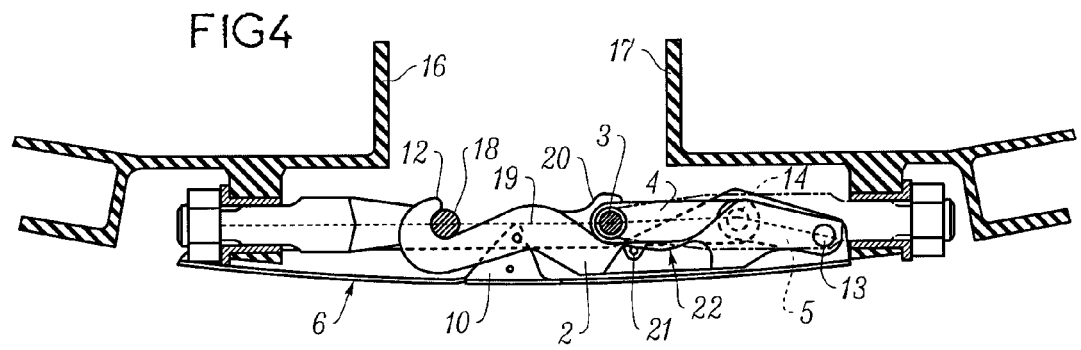

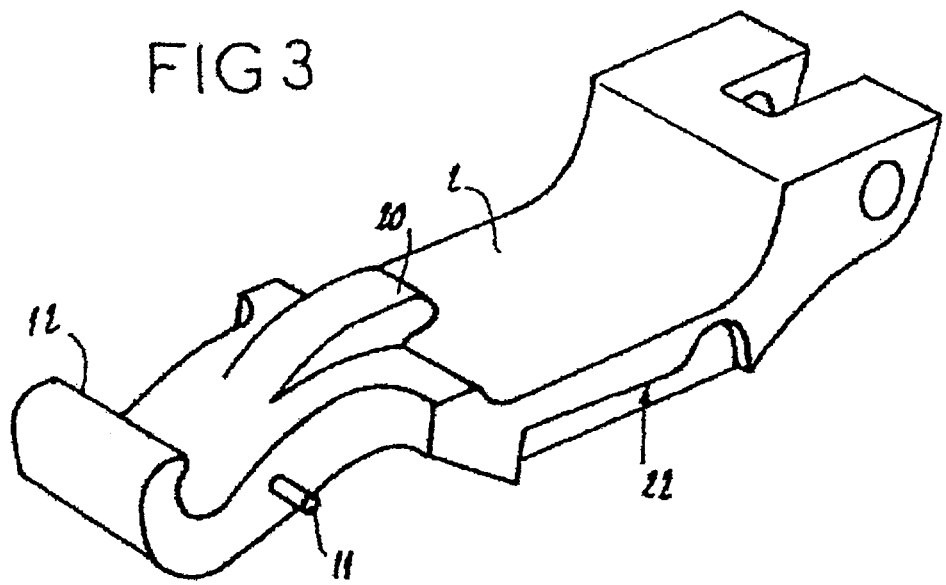

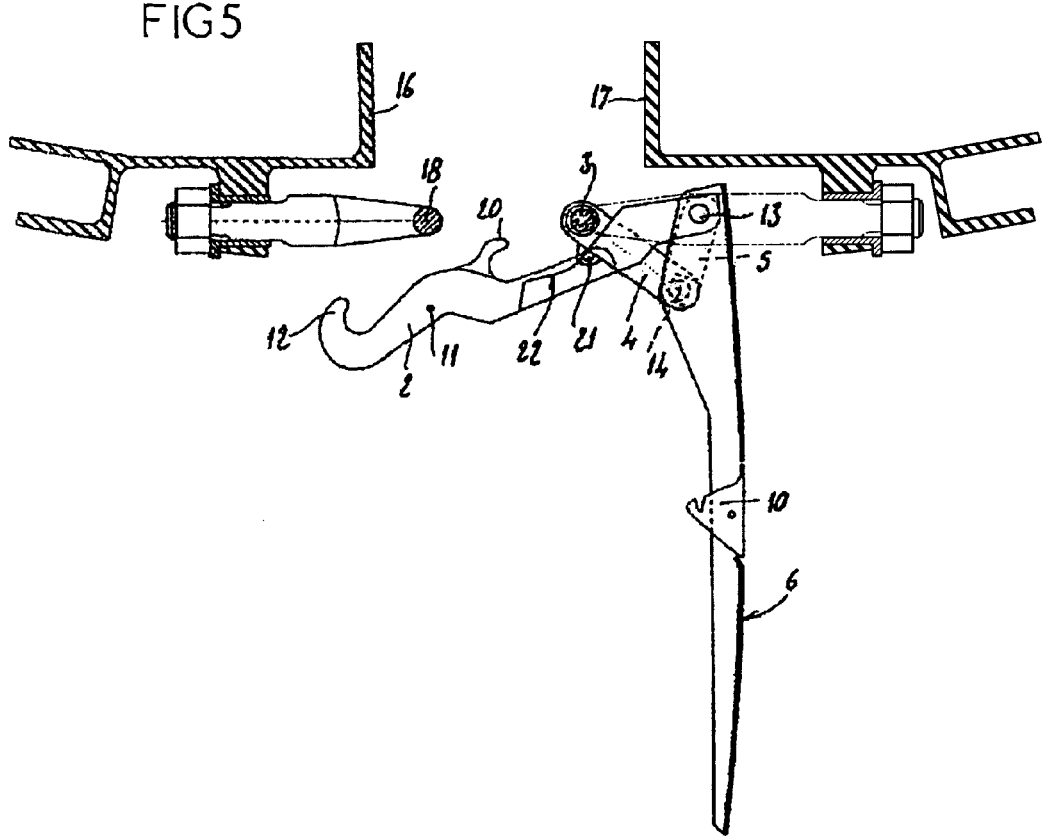
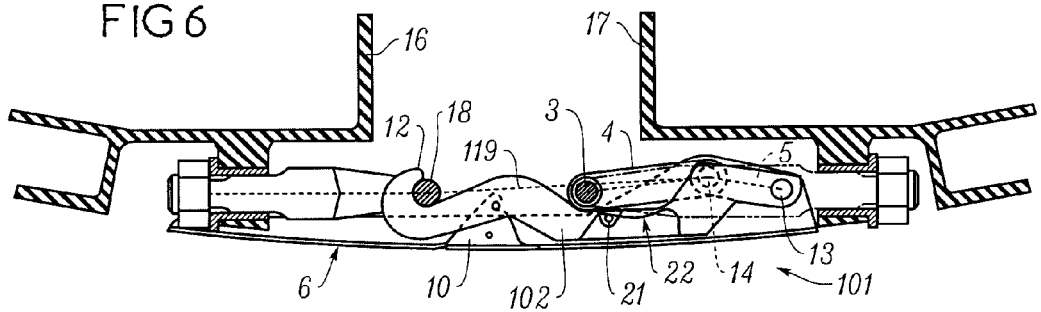
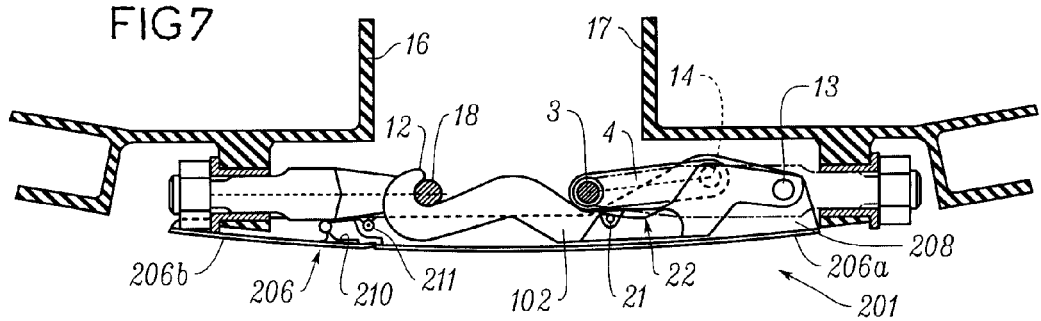

LATCH FOR JOINING TWO PANELS OF AN AIRPLANE STRUCTURE

TECHNICAL FIELD

The present invention relates to a latch designed for joining together two parts, these parts being generally panels of an airplane structure.

BACKGROUND OF THE INVENTION

Patent U.S. Pat. No. 4,318,557 has already disclosed the production of a latch joining two parts and comprising a hook possessing a curved end capable of engaging with a retaining member connected to the first part, an operating member pivoting about an end pin situated at the opposite end from the curved end of the hook, and an articulation divided, on the one hand, into a first pair of compression links pivoting on a main pin designed to be attached firmly to the second part and on an intermediate pin, the latter being positioned between the main pin and the end pin, and, on the other hand, into a second pair of compression links pivoting on said intermediate pin and on the end pin. In such a latch, the static main pin is located between the operating member and the hook, and supports the latter. Generally speaking, such a latch is installed on the underside of an airplane structure, operating member downmost. The kinematics of the latch and the gravity applied to the various parts of the latch therefore contribute to the hook coming away from the retaining member. However, during the phase of opening, in accordance with the balance of the hook on the one hand and the operating member on the other, the curved end of the hook may remain in contact with the retaining member and cause an undesired rotation of the hook about said retaining member. In such a situation, further opening is not permitted in order to prevent damage to the structure or to the latch itself.

To reduce this risk, it is possible for example to place a weight on the curved end of the hook to ensure a sufficient separation of the hook and operating member away from the retaining member when opening the latch. However, such an arrangement has a significant impact on the mass, size and reliability of the latch.

European patent application EP 0 431 769 discloses a latch of the same type comprising a hook containing an elongate closed hole carrying the main pin. The sides of this hole constitute bearing surfaces to limit lateral movement of the hook on the main pin. Such a latch is smaller than the latch according to U.S. Pat. No. 4,318,557, but it is again necessary to employ additional means, such as a weight, to help the hook to move sufficiently away from the retaining member as the latched is opened.

SUMMARY OF THE INVENTION

It is an object of the present invention to solve the problems cited above, and to this end consists of a latch for joining two parts to one another via, on the one hand, a hook possessing a curved end capable of engaging with a retaining member connected to the first part, and, on the other hand, a main pin designed to be attached firmly to the second part, said latch comprising an operating member pivoting about an end pin situated at the opposite end from the curved end of the hook, and an articulation comprising a pair of compression links pivoting on the main pin and on an intermediate pin, the latter being positioned between the main pin and the end pin, which latch is characterized in that the hook is located between the operating member and the main pin, and in that at least one compression link is provided with a guide means capable of contacting that surface of the hook which is nearest the operating member during the opening of the latch.

Consequently a latch according to the present invention is compact because the hook is positioned between the operating member and the main pin. This corresponds to a space which is generally unoccupied in a standard latch. Moreover, the hook is no longer supported by the static main pin but by guide means following an opposite trajectory to that of the hook as the operating member is opened, and as a result the hook is able to move away as required from the retaining member under the effect of its own mass. These means of guidance by contact with that surface of the hook which faces the operating member thus ensure that the assembly composed of the hook and the compression links cannot sag.

Advantageously, each guide means consists of a spur connected to its corresponding compression link.

Also advantageously, each guide means is housed in a recess formed in that surface of the hook which is nearest the operating member. This recess may be larger in an area acting as a housing for the guide means at the end of the latch-opening operation. This amplifies the angular separation between the hook and the retaining member when fully open.

In a first preferred embodiment of the invention, in the locked position, the center of the main pin and the hook lie on either side of a line joining the center of the retaining member to the center of the intermediate pin. In this arrangement, locking is no longer stable, and the latch can pivot about the retaining member. Consequently, the hook is preferably provided with a projection capable of partially covering the main pin in the locked position. This anti-drop projection thus prevents any pivoting of the latch. It is important to understand that the length, width and shape of the nose of the projection have no structural function and can therefore be reduced to a minimum to keep down the mass of the whole.

In a second preferred embodiment of the invention, in the locked position, the center of the main pin is positioned between the hook and a line joining the center of the retaining member to the center of the intermediate pin.

In both preferred embodiments, when the hook is bearing against the main pin in the closed position of the latch, the locked position is made stable when the intermediate pin contacts an end-of-travel stop-piece connected to the latch.

In a first preferred variant of the invention, the latch comprises a second pair of compression links pivoting on the intermediate pin and on the end pin.

In a second preferred variant of the invention, the latch comprises only one pair of compression links, said operating member being firmly attached to the intermediate pin. The operating member is preferably divided into a main structure having an axis on which pivots an end structure situated at the opposite end from the end pin. It is thus possible, in order to enable a secure grip to be obtained on the operating member, to first open the end structure by a few degrees. Advantageously, a stop-piece belonging to the main structure is capable of limiting the angular travel of the end structure. Furthermore, in the locked position, a spring can be used to keep the end structure aligned with the main structure.

Advantageously too, the operating member comprises a window giving access to the hook from the outside. This then means that it is possible, without unlocking the latch, and simply by touching the hook through this window, to see whether the latch components are intact and correctly in position. The overall safety and reliability of the latch are thereby greatly enhanced. In addition, such a hook can have a bore that can be accessed from the outside and in which a through part can be housed, which part can prevent the opening of said latch. The release system can then be inhibited if there is any doubt as to the integrity of the latch or simply as a simple safety measure.

BRIEF DESCRIPTION OF THE DRAWINGS

To enable the invention to be understood more clearly, a detailed description is given below with reference to the accompanying drawing, in which:

FIG. 1 is a perspective view of a latch in the first preferred embodiment of the invention, in the open position;

FIG. 2 is a perspective view of the latch shown in FIG. 1 in the closed position;

FIG. 3 is a perspective view of the hook belonging to the latch shown in FIGS. 1 and 2;

FIG. 4 is a cross section through the latch in the closed position connecting two parts of a structure;

FIG. 5 is a cross section through the latch shown in FIG. 4 in the open position;

FIG. 6 is a cross section through a latch in the second preferred embodiment of the invention, connecting two parts of a structure;

FIG. 7 is a cross section through a latch according to the invention having only one pair of compression links;

DETAILED DESCRIPTION OF THE PREFERRED EMBODIMENTS

Figure 8:
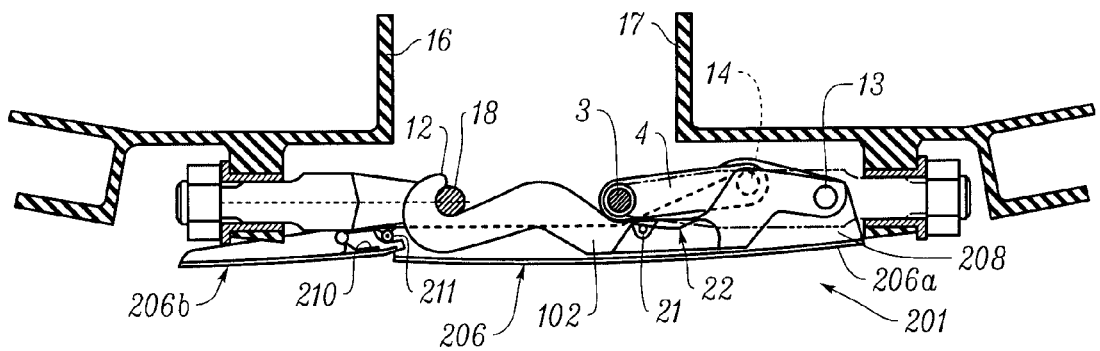
FIG. 8 is a cross section through the latch shown in FIG. 7 at the beginning of the opening operation.

A latch 1 in the first preferred embodiment of the invention, as shown in FIGS. 1-5, is designed to join together two panels 16, 17 of an airplane structure via, on the one hand, a hook 2 capable of engaging with a retaining member 18 connected to the panel 16 and, on the other hand, a main pin 3 attached firmly to the panel 17.

This latch 1 comprises an articulation having a first pair of compression links 4 and a second pair of compression links 5, an operating member in the form of a handle 6 comprising a back 7 and two side flanges 8, a spring 9 for pushing the said handle 6 away from the hook 2, and a release mechanism comprising a rotary-mounted secondary hook 10 associated with a rod 11 connected to the hook 2.

More specifically, the hook 2 comprises a curved end 12 and the handle 6 pivots on an end pin 13 situated at the opposite end from the curved end 12, this end pin 13 passing through the two side flanges 8 of the handle 6. The two links 4, 5 of each pair are positioned on either side of the hook 2, each link 4 pivoting on the main pin 3 and on an intermediate pin 14, the latter being positioned between the main pin 3 and the end pin 13. Each link 5 pivots on the intermediate pin 14 and on the end pin 13. In each flange 8 of the handle 6 is a hole 15 through which the intermediate pin 14 is passed, this hole 15 being produced with a cross section greater than the cross section of the intermediate pin 14.

As shown in FIG. 4, when the latch 1 is in the closed position between the two panels 16, 17, the curved end 12 of the hook 2 is engaged with the retaining member 18 connected to the panel 16, and the main pin 3 is made fast to the panel 17. The center of the main pin 3 and the hook 2 lie on either side of a line 19 joining the center of the retaining member 18 to the center of the intermediate pin 14. The hook 2 is consequently provided with an anti-drop projection 20 designed to partially cover the main pin 3 in order to stabilize the latch 1 in the closed position when the intermediate pin 14 contacts an end-of-travel stop-piece (not shown) on the latch 1.

Each link 4 is provided with a guide means in the vicinity of its end attached to the main pin 3. This guide means is a spur 21 housed in a corresponding recess 22 formed in a part of the surface of the hook 2 that faces the back 7 of the handle 6.

A person wishing to open the latch 1 proceeds as follows. He first applies pressure to the secondary hook 10 to disengage it from the rod 11. The spring 9 is thus able to relax and push the handle 6 of the hook 2 through a few degrees until each end of the intermediate pin 14 is stopped by the edge of the corresponding hole 15. The person can then easily grasp the handle 6 at the end away from the end pin 13 and force it to pivot about this same pin. In the process, owing to the action of the two pairs of compression links 4, 5, the curved end 12 and the projection 20 of the hook 2 are caused to disengage from the retaining member 18 and from the main pin 3, respectively. Collapse of the hook 2 and/or of the links 4, 5 is prevented at this point by the two spurs 21 which remain in permanent contact with the surface of the hook 2 in the recess 22. More specifically, the hook 2 slides against the spurs 21, which follow an opposite trajectory to it, and the main pin 3 is kept away from the hook 2 throughout the opening phase. By the end of this phase, each spur 21 is housed in an area where the recess 22 is larger. As a result, as FIG. 5 shows, the angular distance between the retaining member 18 and the hook 2 is amplified.

To close the latch 1 the user simply grasps the handle 6 and turns it in the opposite direction. This forces the hook 2 to retreat, sliding as it does so over the spurs 21 which tend to recover their initial position.

It should be clearly understood that the projection 20 may be of exactly the same width as the hook 2, or may be much narrower than the hook 2, as shown more particularly in FIGS. 1-3. In the latter case, the projection 20 resembles a claw projecting from the hook 2.

A latch 101 in accordance with the second preferred embodiment of the invention is shown in FIG. 6. This latch 101 differs from the one described above principally in that in the locked position the center of the main pin 3 is located between a hook 102 and a line 119 joining the center of the retaining member 18 to the center of the intermediate pin 14. In the closed position this latch 101 is therefore stable provided the intermediate pin 14 contacts an end-of-travel stop-piece (not shown) on the latch 101. This obviates the need for an anti-drop projection partially covering the main pin 3.

A latch 201 as shown in FIGS. 7 and 8 differs from that shown in FIG. 6 mainly in that it has only one pair of compression links 4 connecting the main pin 3 to the intermediate pin 14. The pair of links 5 connecting the intermediate pin 14 to the end pin 13 has therefore been omitted. However, as described earlier, the links 5 connected to the spring 9 and to the secondary hook 10 made it possible to move the handle 6 of the hook 102 a few degrees away during the initial phase of latch opening. To make up for this, this latch 201 comprises a handle 206 which, on the one hand, possesses two side flanges 208 attached to the end pin 13, but also to the intermediate pin 14, and, on the other hand, is divided into a main structure 206a having a pin on which there pivots an end structure 206b situated at the opposite end from the end pin 13. As shown in FIG. 8, it is thus possible, in order to enable the handle 206 to be grasped securely, to first open the end structure 206b a few degrees. A stop-piece 211 connected to the main structure 206a is provided to limit the angular travel of the end structure 206b. Also, in the locked position, a spring 210 is provided to keep the end structure 206b aligned with the main structure 206a.

Figure 9:
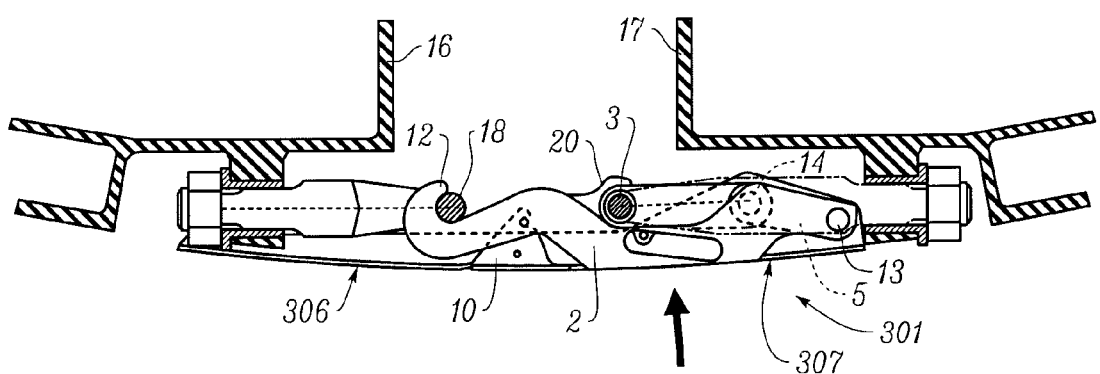
FIG. 9 is a cross section through a latch according to the invention having an operating member with a window.

A latch 301 as shown in FIG. 9 constitutes an alternative embodiment of the latch 1 described above. Here, the main difference is that the latch 301 has a handle 306 containing a window 307 giving access to the hook 2 from the outside. This hook 2 is advantageously constructed so as to extend as far as the outside lines of the handle 306. It is thus possible to check, without unlocking the latch, simply by touching the hook 2 through this window 307, whether the component parts of the latch 301 are intact and correctly positioned. It must be clearly understood that such a window is in no way limited to particular shapes or dimensions on the one hand, and can also be made in a latch in accordance with the second preferred embodiment of the invention, on the other hand.

Figure 10:
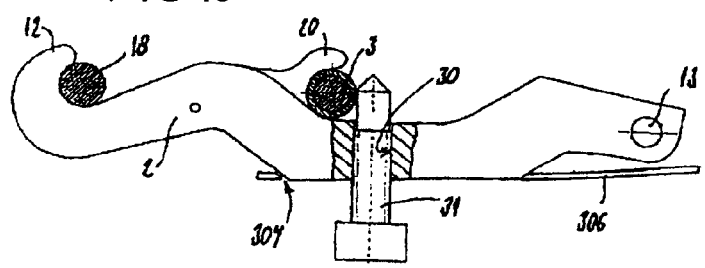
FIG. 10 is a partial view in cross section of a latch according to the invention with a bore accessible from the outside.

Finally, as shown in FIG. 10, the hook 2 may have a bore 30 to house a through part 31 visible from the outside and designed to prevent the handle 306, and therefore the latch, from being opened.

Although the invention has been described in connection with certain particular embodiments of the invention, it will be clear that it is in no sense limited to these and that it embraces all technical equivalents of the means described, and combinations of these if the latter come within the scope of the invention.

The invention claimed is:

1. A latch for joining two parts to one another, comprising:
   a hook possessing a curved end arranged to engage with a retaining member connected to a first part;
   a main pin designed to be attached firmly to a second part;
   a single operating member pivoting about an end pin situated on the hook at an opposite end from the curved end of the hook; and
   an articulation including a pair of compression links pivoting on the main pin and on an intermediate pin located on the operating member, the intermediate pin being positioned between the main pin and the end pin when the latch is closed,
   wherein the hook is located between the operating member and the main pin, and at least one of the compression links is provided with a guide means contacting a surface of the hook which is nearest the operating member during the opening of the latch, such that the hook is supported by the guide means when the latch is open,
   wherein the guide means consists of a spur connected to its corresponding compression link and the spur is housed in a recess formed in the surface of the hook which is nearest the operating member.

2. The latch as claimed in claim 1, wherein the recess is larger in an area that acts as a housing for the guide means at the end of the latch-opening operation.

3. The latch as claimed in claim 1, wherein in the locked position, the center of the main pin and the hook lie on either side of a line joining the center of the retaining member to the center of the intermediate pin.

4. The latch as claimed in claim 3, wherein the hook is provided with a projection capable of partially covering the main pin in the locked position.

5. The latch as claimed in claim 1, wherein, in the locked position, the center of the main pin is positioned between the hook and a line joining the center of the retaining member to the center of the intermediate pin.

6. The latch as claimed in claim 1, further comprises a second pair of compression links pivoting on the intermediate pin and on the end pin.

7. The latch as claimed in claim 1, wherein the operating member is firmly attached to the intermediate pin.

8. The latch as claimed in claim 7, wherein the operating member is divided into a main structure having a pivoting axis and an end structure situated at an end opposite end from the end pin.

9. The latch as claimed in claim 8, wherein a stop-piece belonging to the main structure is capable of limiting the angular travel of the end structure.

10. The latch as claimed in claim 8, wherein, in the locked position, a spring keeps the end structure aligned with the main structure.

11. The latch as claimed in claim 1, wherein the operating member comprises a window giving access to the hook from the outside.

12. The latch as claimed in claim 11, wherein the hook has a bore that can be accessed from the outside and in which a through part can be housed, preventing the opening of the latch.

* * * * *